United States Patent
Sabato et al.

(10) Patent No.: US 8,019,987 B2
(45) Date of Patent: Sep. 13, 2011

(54) SYSTEM CONFIGURATION ANALYSIS

(75) Inventors: Sivan Sabato, Mazkeret Batya (IL); Talya Meltzer, Rehovot (IL)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 12/028,838

(22) Filed: Feb. 11, 2008

(65) Prior Publication Data

US 2009/0204561 A1 Aug. 13, 2009

(51) Int. Cl.
*G06F 1/24* (2006.01)
*G06F 9/00* (2006.01)
*G06F 15/00* (2006.01)
*G06F 15/18* (2006.01)

(52) U.S. Cl. .......... 713/100; 706/62

(58) Field of Classification Search .......... None
See application file for complete search history.

(56) References Cited

U.S. PATENT DOCUMENTS

| 6,687,654 B2 * | 2/2004 | Smith et al. .......... 702/183 |
| 6,694,286 B2 * | 2/2004 | Ottosson .......... 702/182 |
| 6,738,811 B1 * | 5/2004 | Liang .......... 709/224 |
| 6,892,317 B1 | 5/2005 | Sampath et al. |
| 7,058,858 B2 | 6/2006 | Wong et al. |
| 2003/0237017 A1 | 12/2003 | Jibbe |
| 2005/0188268 A1 | 8/2005 | Verbowski et al. |

OTHER PUBLICATIONS

Wang et al., "PeerPressure for automatic troubleshooting" (Microsoft Research) 2004.
Kiciman et al. "Discovering Correctness Constraints for Self-Management of System Configuration" (Microsoft Research).

* cited by examiner

*Primary Examiner* — Jeffrey A Gaffin
*Assistant Examiner* — Stanley K Hill

(57) ABSTRACT

In accordance with one embodiment, a method for detecting potential problems in the configuration or components of a complex system comprises comparing first configuration data for a first system with second configuration data compiled from analyzing a plurality of systems in a selected population; and reporting anomalies associated with the first system, in response to determining that the first configuration data deviates from components determined to be common to the selected population.

22 Claims, 4 Drawing Sheets

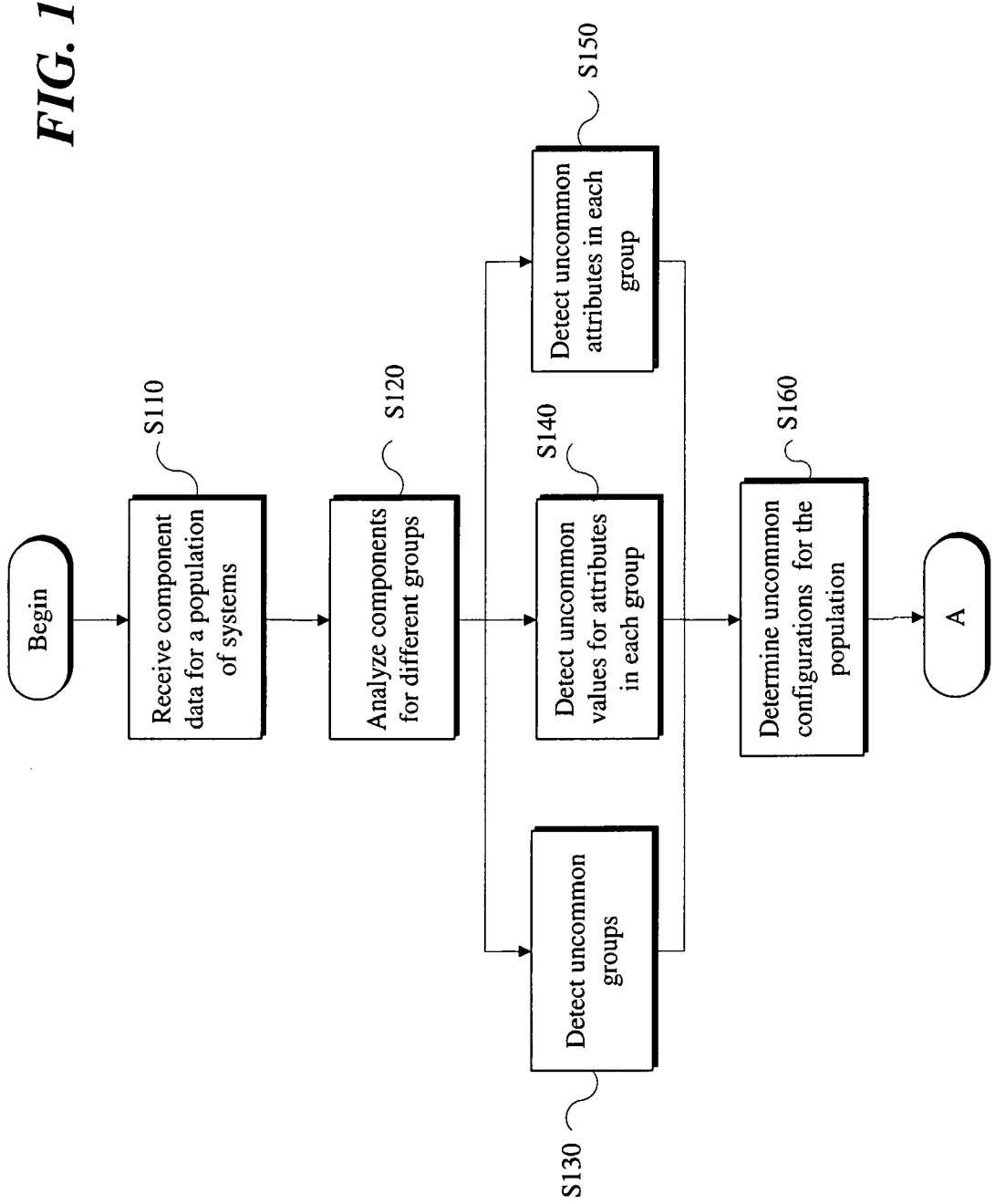

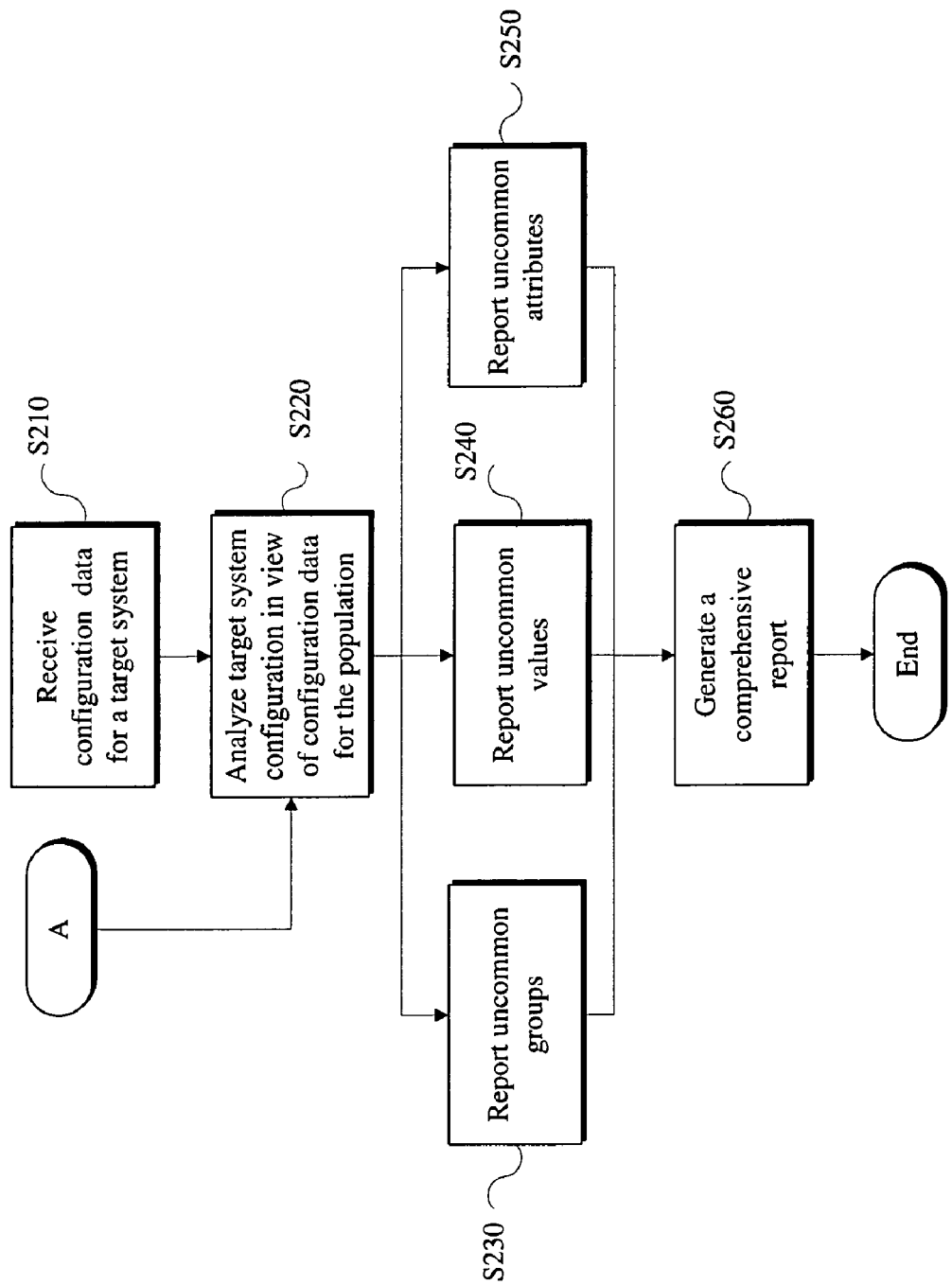

FIG. 3

| Score | Score Type | CIM Type | Property Name | Value | Frequency | Most Common Values | Percentage |
|---|---|---|---|---|---|---|---|
| 99 | Uncommon value | Logical Device [DeviceClass: keyboard] | Manufacturer | silitek | 0.05% | (standard keyboards) | 68% |
| | | | | | | { } | 9% |
| | | | | | | microsoft sms solutions | 8% |
| 98 | Uncommon value | Logical Device [DeviceClass: hidclass] | Manufacturer | silitek | 0.09% | (standard system devices) | 66% |
| | | | | | | microsoft | 13% |
| | | | | | | { } | 11% |
| 94 | Uncommon value | Logical Device [DeviceClass: mouse] | Manufacturer | logitech | 0.32% | microsoft | 88% |
| | | | | | | microsoft sms solutions | 7% |
| 93 | Uncommon value | Logical Device [DeviceClass: hidclass] | Manufacturer | logitech | 0.36% | (standard system devices) | 66% |
| | | | | | | microsoft | 13% |
| | | | | | | { } | 11% |
| 83 | Uncommon value | Logical Disk | DiskQuotaStatus | 1 | 0.84% | 0 | 96% |
| 75 | Uncommon value | Logical Device [DeviceClass: scsiadapter] | OtherIdentifyingInfo | { emulex lightpulse hba - storport miniport driver } | 1.27% | { } | 98% |
| 51 | Uncommon value | System Service Information [Name: snmptrap] | Version | 5.2.3790.1830 (srv03_sp1_rtm.050324-1447) | 2.46% | 5.2.3790.0 (srv03_rtm.030324-2048) | 66% |
| | | | | | | 5.00.2195.6601 | 29% |
| 46 | Uncommon value | PCI Device | ProgrammingInterface | 128 | 2.71% | 0 | 32% |
| | | | | | | 32 | 23% |
| | | | | | | 138 | 21% |
| | | | | | | 16 | 13% |
| | | | | | | 130 | 7% |
| 37 | Uncommon value | USB Device | USBVersion | 256 | 3.16% | 272 | 48% |
| | | | | | | 512 | 22% |
| | | | | | | 110 | 15% |
| | | | | | | 200 | 11% |
| 25 | Uncommon value | Device Driver Information [Name: elxstor] | CurrentState | 4 | 3.75% | 1 | 96% |
| 25 | Uncommon value | Device Driver Information [Name: elxstor] | StartupState | 0 | 3.75% | 4 | 96% |

SYSTEM CONFIGURATION ANALYSIS

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to a method and system for analyzing a system's configuration in light of information gathered about configuration of a plurality of systems in a population to which the system may belong.

BACKGROUND

Complex environments including computer systems, software systems, or even mechanical systems like vehicles include a large number of components and have many configuration parameters and options. In such complex environments, a faulty configuration or component may be difficult to detect, due to the large number of components and parameters involved. Therefore, users and administrators in such environments need to be able to identify configuration issues that may cause system problems or explain problems that have already occurred.

Especially, in the case of a dormant problem, a human operator will have a very difficult time if he is to manually analyze every component and configuration in a complex system so that he can detect a defect. It is possible to implement an automated scheme to detect system defects. This automated process, however, requires the manual identification and entry of predefined rules and test conditions by a human operator.

When using predefined rules, a defect or faulty condition may be detected only if these rules cover the defect or the faulty condition. Further, in complex systems it is a daunting and usually an impossible task to manually find the full set of rules to cover every aspect of a system. That is, the configuration space is generally so vast that it is impossible to efficiently test all configurations and identify all the required rules.

Systems and methods are desirable that can summarize a target system's configuration information and provide a succinct report that indicates the possible problem areas in the target system.

SUMMARY

The present disclosure is directed to systems, methods and corresponding products that facilitate detecting potential problems in the configuration or components of a complex system.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for detecting potential problems in the configuration or components of a complex system comprises comparing first configuration data for a first system with second configuration data compiled from analyzing a plurality of systems in a selected population; and reporting anomalies associated with the first system, in response to determining that the first configuration data deviates from components determined to be common to the selected population.

In one embodiment, the second configuration data is compiled for a selected population with a membership that dynamically changes as one or more systems are added or removed from the selected population. The first configuration data may comprise information about attributes associated with the first system's components or the components of one or more systems in the selected population. The first configuration data may comprise information about values assigned to attributes associated with the first system's components.

In one embodiment, the second configuration data may comprise information about values assigned to attributes associated with components of one or more systems in the selected population. The second configuration data is compiled from grouping systems together that have uncommon components from among said plurality of systems in the selected population or from systems having uncommon attributes associated with one or more components or from systems having uncommon values associated with one or more attributes. In one embodiment, a threshold is calculated to identify the anomalies associated with the first system by determining probability for one or more of said components to be anomalous, wherein a missing mass estimation scheme is utilized to calculate the threshold.

In one embodiment, it may be determined whether any configuration data for the first system not identified as anomalous may be deemed anomalous using a missing mass estimation scheme. Anomalies associated with the first system may not be reported, in response to determining that said anomalies correspond to system properties that do not have a predetermined level of probability mass concentrated in a small number of values, or in response to determining that the frequency of anomalous value for a first system property divided by the frequency of least common normal value for the first system is greater than a first threshold.

In accordance with one embodiment, a computer program product comprising a computer useable medium having a computer readable program is provided, wherein the computer readable program when executed on a computer causes the computer to compare first configuration data for a first system with second configuration data compiled from analyzing a plurality of systems in a selected population; and report anomalies associated with the first system, in response to determining that the first configuration data deviates from components determined to be common to the selected population. The second configuration data is compiled for a selected population with a membership that dynamically changes as one or more systems are added or removed from the selected population.

In accordance with another embodiment, a system comprises a data storage medium in operational relationship with at least one controller comprising a logic unit to compare first configuration data for a first system with second configuration data compiled from analyzing a plurality of systems in a selected population; and a logic unit to report anomalies associated with the first system, in response to determining that the first configuration data deviates from components determined to be common to the selected population.

The second configuration data is compiled for a selected population with a membership that dynamically changes as one or more systems are added or removed from the selected population. The first configuration data comprise information about attributes associated with the first system's components. The second configuration data comprises information about attributes associated with components of one or more systems in the selected population. The first configuration data comprise information about values assigned to attributes associated with the first system's components.

In accordance with one aspect of the invention, a system comprising one or more logic units is provided. The one or more logic units are configured to perform the functions and operations associated with the above-disclosed methods. In yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

FIG. 1 is a flow diagram of a method for collecting information to detect defects in a target system, in accordance with one embodiment.

FIG. 2 is a flow diagram of a method for detecting fault in the target system based on collected information from a population of systems to which the target system may belong, in accordance with one embodiment.

FIG. 3 illustrates an exemplary representation of a graphical user interface that provides information about a target system configuration in view of configuration information gathered from a selected population of systems.

Features, elements, and aspects of the invention that are referenced by the same numerals in different figures represent the same, equivalent, or similar features, elements, or aspects, in accordance with one or more embodiments.

DETAILED DESCRIPTION OF PREFERRED EMBODIMENTS

Figure 4:
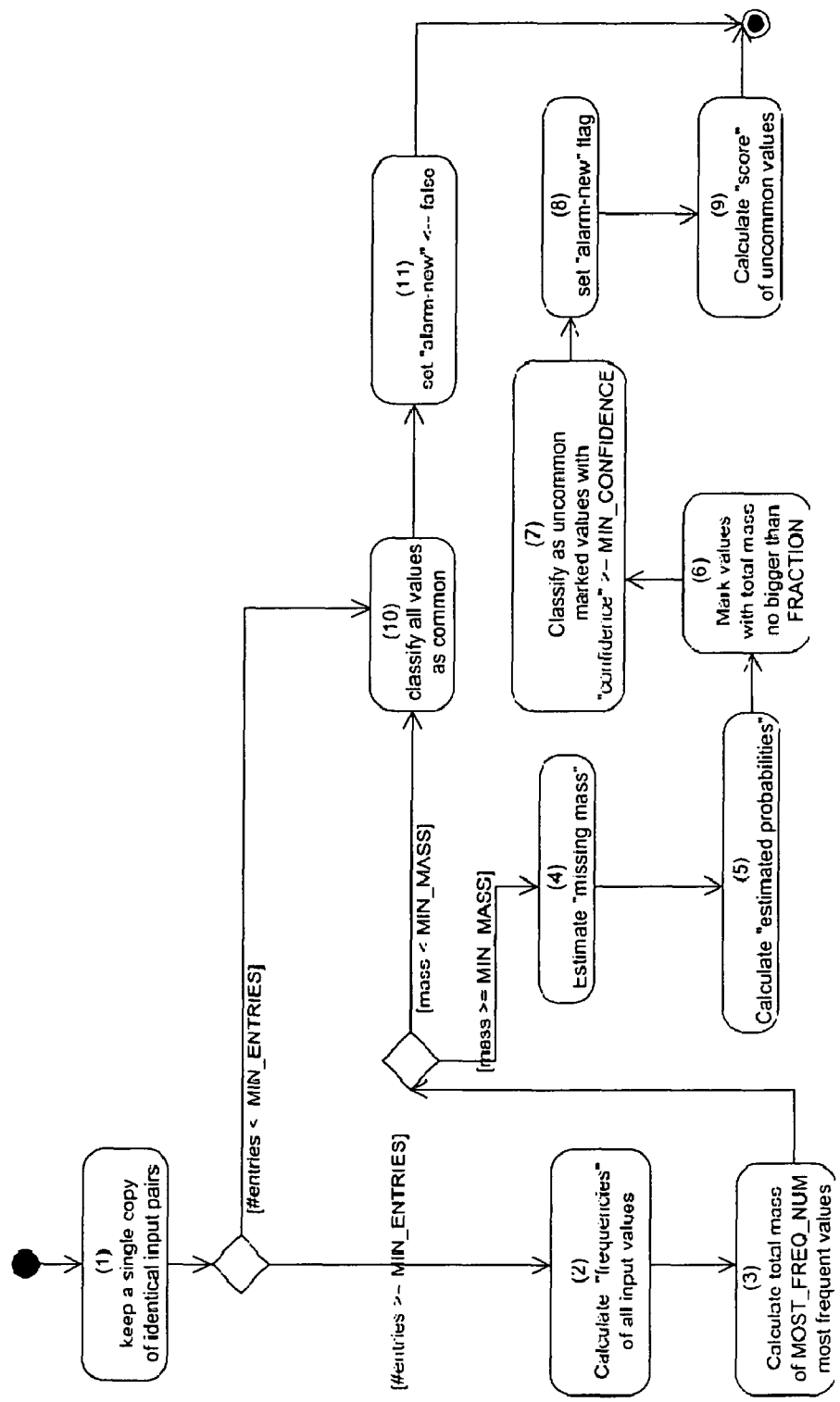
FIG. 4 illustrates an exemplary flow diagram of a method for detecting uncommon values in a population of systems for the purpose of analyzing a target system's configuration and components, in accordance with one embodiment.

In the following, numerous specific details are set forth to provide a thorough description of various embodiments of the invention. Certain embodiments of the invention may be practiced without these specific details or with some variations in detail. In some examples, certain features are described in less detail so as not to obscure other aspects of the invention. The level of detail associated with each of the elements or features should not be construed to qualify the novelty or importance of one feature over the others.

In accordance with one embodiment, information about configuration of a target system (e.g., a test system) and its various components may be collected by (1) gathering information about similar components in a population of other systems comparable to the target system and (2) comparing the components, attributes and respective values associated with the target system with that of the population, at large, to determine any anomalies in the configuration of the target system.

A target system may include a collection of components that operate together to achieve a purpose. A system may be represented by an unordered list of the representations of its components. A designation of a category to a component, e.g., by the function of the component, is referred to as a component class. For example, in a computer system, a hard drive can be designated the category 'storage devices'.

A component may be a part of a system that performs a certain function. For example, a processor may be defined as a component of a computing system that executes instructions. A component may be represented as an unordered list of attributes and their value, and a designation of category. For example, a vehicle air-bag can be represented as a component of category 'safety-devices', with the attribute-value pairs <size, 20 cm> and <location, 'driver-seat'>, in accordance with one embodiment.

A system may include any number of components, including several components of the same category or components from a specific category. A component may be specified by any number of attributes. Different components may be specified by different attributes, including components from the same category. For example, two computer hard-drives may both be described as components of class 'storage-device', where the representation of one hard-drive would include its interface type while the representation of the other would not include this attribute at all.

The following is a simplified example of a representation of a system including components C1, C2, and C3.

C1: {<class=processor>, <speed, 3 GHz>, <cache exists, yes>, <cache size, 100 KB>}

C2: {<class=processor>, <size, 4 cm>, <speed, 3 GHz>, <cache exists, no>, <number of DMAs, 6>}

C3: {<class=storage-device>, <size, 4 GByte>, <interface, SCSI>}

Information used to identify anomalies in a target system can be collected in a dynamic fashion such that if the configuration of one or more systems in a population changes, or if one or more systems are added or removed from the population, then the values against which the target system is compared also change consistent with the change in the population's new statistics. Such dynamic analysis, advantageously, eliminates or limits the need for a human operator (i.e., system administrator) to manually monitor or change a set of rules that define the system attributes or values that are considered to be within the norm (e.g., an acceptable range for said values or attributes).

Accordingly, the analysis of a target system in certain embodiments is performed by statistically determining those attributes, values or components of the target system that are within an acceptable range (i.e., herein referred to as "common") or those attributes, values or components that fall outside the acceptable range (i.e., herein referred to as "uncommon"). A statistical analysis thus may be applied to the information collected from a plurality of systems in a population to determine common or uncommon components, attributes, values or groups.

In certain embodiments, the data obtained from the statistical analysis may be further fine-tuned to select information or generate a report that is meaningful within a certain context. That is, in certain circumstances those configurations (e.g., values, attributes or components) are considered as applicable if such configurations satisfy a certain threshold or condition as provided in more detail below.

In accordance with one embodiment, for example, attributes or values or components that are not found in a large enough number of systems in the population may not be considered as warranting any reporting value and thus may not be included in the analysis or a report. As another example, variance among values for groups in a population may be considered such that if the difference in the frequency of the values is not beyond a certain threshold (e.g., there is no substantial difference) then neither of the values will be considered anomalous.

In yet another exemplary embodiment, a flag indicator of presence of excessive variety in one attribute may be set based on a determination to exclude certain attributes from the report, even though such attributes may be considered worthy of reporting in other embodiments. For example, a "username" attribute may be determined to be uncommon for all accounts, since it is unique for every account. Reporting the username for every account, however, would be undesirable because such variety in this attribute is expected and therefore should not be reported.

A verification system for detecting defects in a complex system, in accordance with one embodiment, may include a training module (See FIG. 1), and an analysis module (See FIG. 2). The training module receives as input the configuration of a set of systems in a population, and uses the related data to generate results that can be used by the analysis module to determine fault in a target system. These results may be used as input to the analysis scheme.

The results, i.e. the output of the training module, may include the following information: (a) the frequency of each value that appeared in the input; (b) a list of the values determined to be common to the selected population; (c) a list of the values determined to be uncommon to the selected population; (d) an indicator to indicate whether a new value, which was not seen in the input, should be considered as uncommon; and (e) a score given to each uncommon value, such that, for example, a higher score denotes a value that is less frequent.

The analysis module receives as input information about a target system and the results from the training module, and outputs a configuration analysis of the target system. The training module may be executed once, on a large set of systems (i.e., a population of systems), to generate the base statistics for that population's components. The analysis module may be executed each time a new target system is analyzed.

Referring to FIG. 1, to obtain the base statistics for a population of systems, component data of a plurality of systems in said population is received (S110), by the training module, for example. The components of different groups of systems in the population are then analyzed (S120) by the analysis module, for example. The analysis module may be configured for detecting: uncommon groups among the components (S130), uncommon values for attributes in each group (S140), or uncommon attributes in each group (S150), or any combination thereof. Based on the above analysis, uncommon configurations for the population may be determined according to a statistical approach.

Referring to FIG. 2, the configuration data for the population, obtained from the training module, may be then provided to the analysis module (see Block A) in addition to configuration data associated with a target system (S210). The target system configuration may be analyzed in view of configuration data for the population (S220) to determine the components, attributes or values associated with the target system that may be considered to fall in the uncommon category as discussed earlier. For example, one or more of the following information may be reported or identified: uncommon groups (S230), uncommon values (S240) and uncommon attributes (S250). Finally, a comprehensive report about the state and values associated with a system's configuration may be generated (S260) to identify the problem areas or potential defects.

The faulty or defective areas may be defined or detected based on those groups, components, attributes or values that are identified as belonging to the uncommon category. According to one embodiment, configuration information for the population (or the target system) may be stored in a repository (i.e., data storage system). The repository can include configurations of faulty and well-configured systems within the population. In one embodiment, the repository represents the real population of systems in a corporate entity, or plurality of systems serviced by an information technology service provider.

It is noteworthy that in complex systems, even if many systems in the repository have certain defects in certain configurations or components, it is generally the case that the faults and their causes are diverse, so that each specific configuration parameter or option is faulty in a small number of systems in the repository. Therefore, it can be assumed that if a specific configuration parameter or option has the same value across a large percentage of the systems, then this value may not be considered as identifying a defective condition.

FIG. 3 illustrates an exemplary representation of a graphical user interface (e.g., table) that provides information about a target system configuration in view of configuration information gathered from a selected population of systems. In this exemplary representation, the first column represents the score assigned to detected uncommon values, the second column represents the type of anomaly that was detected, the third column represents the component in which an anomaly was found, the fourth column represents the field in which an anomaly was found, the fifth column represents the value of the field in the target system, the sixth column represents the frequency of this value in the population of systems, the seventh column represents the most common values that were found for this field in the population of systems, and the eight column represents the frequency of each of the most common values in the population of systems. As shown, the first row in the table, for example, indicates that keyboard logical device in the target system has been manufactured by silitek, that this manufacturer of keyboard was found in 0.05% of the population of systems, and that the most common manufacturer descriptions in the system population are '{standard keyboards}', '{ }', and 'microsoft sms solutions'.

FIG. 4 illustrates an exemplary flow diagram of a method for collecting statistics from a population of systems for the purpose of analyzing a target system's configuration and components. This method may be used to implement S130, S140 and S150 in FIG. 1. In the following certain parameters are defined according to a naming convention that is exemplary and as such should not be construed as limiting the scope of this disclosure to any particular values or names disclosed herein.

Such exemplary parameters are:
MIN_ENTRIES: The minimal number of entries under which the algorithm should not classify any value as uncommon.
MOST_FREQ_NUM and MIN_MASS: in order to classify any of the values as uncommon, it is required that the sum of frequencies of the MOST_FREQ_NUM most frequent values is at least MIN_MASS.

FRACTION: The maximal mass (or sum of frequencies) of values that may be classified as uncommon, including values that haven't been seen in the input.

MIN_CONFIDENCE: The minimal confidence required for classifying a value as uncommon (see explanation for "confidence" below).

In the following list, numbers correspond to numbering in the diagram above.

For the purpose of example, two systems S1 and S2 are discussed below. These systems comprise the population on which statistics are gathered in the training module. S1 may be represented as the set of components C1, C2 and C3, all of the same class T1:

C1: {<class=T1>, <field1, a>, <field2, b>, <field3, c>}
C2: {<class=T1>, <field1, a>, <field4, d>}
C3: {<class=T1>, <field1, d>, <field3, c>}

S2 may be represented as the set of components C4, C5 and C6, all of the same class T1:

C4: {<class=T1>, <field1, d>, <field2, e>}
C5: {<class=T1>, <field2, b>, <field3, c>}
C6: {<class=T1>, <field1, f>, <field3, g>}

One embodiment of the training module may be implemented to detect the values that are uncommon in field1, according to the set of values for field1 that exist in the population: {<a, S1>, <a, S1>, <d, S1>, <d, S2>, <f, S2>}.

Referring to systems S1 and S2 for the purpose of example, in accordance with one exemplary implementation, operation blocks 1 through 9 in FIG. 4 may be defined as provided below:

1. Keep one copy of each value for each system it appears on. The input generated for the attribute "field1" would be: {<a, S1>, <a, S1>, <d, S1>, <d, S2>, <f, S2>}. At this step of the algorithm, the input would be reduced to: {<a, S1>, <d, S1>, <d, S2>, <f, S2>}, and the value "a" would be counted once, although it appears twice on the same system, while the value "d" would be counted twice, as it appeared on 2 different systems.

2. Calculate the frequencies of all input values: Let $x_1, \ldots, x_m$ be the m different values that appear in the input, and let $n_1, \ldots, n_m$ be the number of different systems each value appeared in. Let N be the total number of entries, $$N = \sum_{i=1}^{m} n_i.$$

Then, the frequency of the value $x_i$ is $$f_i = \frac{n_i}{N}.$$

3. Calculate the sum of frequencies of the MOST_FREQ_NUM most frequent values, and check whether it is at least MIN_MASS. If the sum is less then MIN_MASS, all values will be classified as common (steps 9, 10). When there is a small number of values that are together very common, the values are preferably classified as uncommon. For example, suppose we have MOST_FREQ_NUM=4 and MIN_MASS=80% and consider the following set of input entries: 33 different values appear 3 times each, and one other value appears once. Without any additional requirement, the value with the single appearance could be classified as uncommon, which is counter-intuitive, because other values are also not very common.

4. Estimate the missing mass: The missing mass is the probability that in a new randomly chosen system the attribute would have a value that did not appear in the input list, assuming that the systems in the input have also been randomly chosen. For example, in a computer system, suppose there is a "file name" attribute associated with components of class "network-driver". Usually the same file name appears on most of the drivers, but there are some unique names which are very rare. Some of those names may appear in the training input, but some may not. In order to get a better approximation to the probabilities of the different possible file names, the "missing mass" of all those rare values which were not yet seen should be estimated. This probability is estimated to be the frequency of all values that appeared only once in the input:

$$\hat{p}_{MM} = \frac{\sum_{i=1}^{m} \delta(n_i = 1)}{N}.$$

This approximation is based on the following work: "The population frequencies of species and the estimation of population parameters" [Biometrika, 40(16):237-264, December 1953].

5. Calculate estimated probabilities: calculate an estimate for the probability that in new randomly chosen system the attribute would have the value $x_i$, assuming that the training input also comes from randomly chosen systems. The estimated probability to see $x_i$ is $\hat{p}_i = (1 - \hat{p}_{MM}) \cdot f_i$. This is the empiric frequency of the value $f_i$ re-weighted according to the missing mass $\hat{p}_{MM}$, such that all the estimated probabilities sum to 1:

$$\hat{p}_{MM} + \sum_{i=1}^{m} \hat{p}_i = 1$$

6. Mark all values with total mass no bigger than FRACTION:
   a. Sort the input value $x_1, \ldots, x_m$ such that their estimated probabilities satisfy: $\hat{p}_1 \leq \hat{p}_2 \leq \ldots \leq \hat{p}_m$
   b. Find the maximal k such that $$\hat{p}_{MM} + \sum_{i=1}^{k} \hat{p}_i \leq \text{FRACTION}.$$

If $\hat{p}_{MM}$>FRACTION set k=0.
   c. Mark $x_1, \ldots, x_k$ as potential candidates for being classified as uncommon (if k=0 then no value will be marked).

7. For each marked value $x_i$, i=1, \ldots, k:
   a. Calculate the confidence of $x_i$. The confidence of $x_i$ is the ratio $$\frac{f_{k+1}}{f_i},$$

where $f_{k+1}$ is the frequency of the least common value that was not marked, and $f_i$ is the frequency of the value $x_i$.

b. Classify $x_i$ as uncommon only if the confidence is at least the confidence threshold, i.e. if $$\frac{f_{k+1}}{f_i} \geq \text{MIN\_CONFIDENCE}$$

This step is required to avoid reporting values as uncommon in the case where there are many different values that appear with low frequency, and yet some of them are reported as uncommon due to a slightly lower frequency.

8. Set the alarm-new flag: This flag indicates whether a new value, which did not appear in the input, should be classified as uncommon.

a. Estimate the frequency of a single new value to be $$\tilde{f}_{NEW} = \frac{1}{N},$$

where N is the total number of entries in the input.

b. Calculate the confidence of a new value:

$$\frac{f_{k+1}}{\tilde{f}_{NEW}} = \frac{n_{k+1}/N}{1/N} = n_{k+1},$$

where $n_{k+1}$ is the number of appearances of $x_{k+1}$ in the input.

c. Set "alarm-new"=true if and only if the confidence of a new value is at least the confidence threshold, i.e. $n_{k+1} \geq \text{MIN\_CONFIDENCE}$ 9. Calculate score of uncommon values: for each value classified as uncommon, a score of its unusualness is calculated. This score is higher if the value is less frequent. The score is $$1 - \frac{f_i}{\text{FRACTION}},$$

where $f_i$ is the frequency of the uncommon value $x_i$, and FRACTION is a parameter defining the maximal mass of uncommon values. If the total mass of MOST_FREQ_NUM is less then MIN_MASS, all values are classified as common (see step 2 for explanations). Following step 9, new values that did not appear in the input are also classified as common, and hence "alarm-new" is set to "false".

In some embodiments a relatively high fraction value (e.g., 5%) is used in order to detect uncommon values, compared to a fraction value used in order to detect uncommon attributes (e.g., 1%). While detecting uncommon attributes produces entries with two possible values where one of them may be uncommon, detecting uncommon values produces entries with a number of possible values that may be very diverse.

In order to enable a classification of more than one value as uncommon, the threshold used in the latter case may be higher. For example, consider some attribute "field1" indicates that 1% of the systems had no component with the attribute, 1% of the systems had components with the value "a", 1% with the value "b" and 97% with the value "c". thus one would say that the values "a" and "b" are uncommon, and also that it is uncommon not to have the attribute "field1" on a component of a randomly chosen system. Yet, if fraction is set to 1% one of the values "a" and "b" would be marked as potentially-uncommon, but then fail the confidence test.

The invention can take the form of an entirely hardware embodiment, an entirely software embodiment or an embodiment comprising both hardware and software elements. In one embodiment, the invention may be implemented in software, which may comprise firmware, resident software, microcode, and ACMs, without limitation.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

It should also be understood that the logic code, programs, modules, processes, methods and the order in which the respective steps of each method disclosed here are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A computer-implemented method for execution on one or more processors, the method comprising:
    comparing first configuration data for a first system with second configuration data compiled from analyzing a plurality of systems in a selected population; and
    reporting anomalies associated with the first system, in response to determining that the first configuration data deviates from components determined to be common to the selected population,
    wherein the second configuration data is compiled from grouping systems together that have uncommon components from among said plurality of systems in the selected population,
    wherein the second configuration data is compiled from systems having uncommon attributes associated with one or more components, and
    wherein the second configuration data is compiled from systems having uncommon values associated with one or more attributes.

2. The method of claim 1 wherein the second configuration data is compiled for a selected population with a membership that dynamically changes as one or more systems are added or removed from the selected population.

3. The method of claim 1 wherein the first configuration data comprises information about attributes associated with the first system's components.

4. The method of claim 1 wherein the second configuration data comprises information about attributes associated with components of one or more systems in the selected population.

5. The method of claim 1 wherein the first configuration data comprises information about values assigned to attributes associated with the first system's components.

6. The method of claim 1 wherein the second configuration data comprises information about values assigned to attributes associated with components of one or more systems in the selected population.

7. The method of claim 1 wherein a threshold is calculated to identify the anomalies associated with the first system by determining probability for one or more of said components to be anomalous.

8. The method of claim 7 wherein a missing mass estimation scheme is utilized to calculate the threshold.

9. The method of claim 1 further comprising determining whether any configuration data for the first system not identified as anomalous is anomalous using a missing mass estimation scheme.

10. The method of claim 1 further comprising ceasing to report anomalies associated with the first system, in response to determining that said anomalies correspond to system properties that do not have a predetermined level of probability mass concentrated in a small number of values.

11. The method of claim 1 further comprising ceasing to report anomalies associated with the first system, in response to determining that the frequency of anomalous value for a first system property divided by the frequency of least common normal value for the first system is greater than a first threshold.

12. A computer program product comprising a non-transitory computer storage medium having a computer readable program, wherein the computer readable program when executed on a computer causes the computer to:
compare first configuration data for a first system with second configuration data compiled from analyzing a plurality of systems in a selected population; and
report anomalies associated with the first system, in response to determining that the first configuration data deviates from components determined to be common to the selected population,
wherein the second configuration data is compiled from grouping systems together that have uncommon components from among said plurality of systems in the selected population,
wherein the second configuration data is compiled from systems having uncommon attributes associated with one or more components, and
wherein the second configuration data is compiled from systems having uncommon values associated with one or more attributes.

13. The computer program product of claim 12 wherein the second configuration data is compiled for a selected population with a membership that dynamically changes as one or more systems are added or removed from the selected population.

14. The computer program product of claim 12 wherein the first configuration data comprise information about attributes associated with the first system's components.

15. The computer program product of claim 12 wherein the second configuration data comprises information about attributes associated with components of one or more systems in the selected population.

16. The computer program product of claim 12 wherein the first configuration data comprise information about values assigned to attributes associated with the first system's components.

17. The computer program product of claim 12 wherein the second configuration data comprise information about values assigned to attributes associated with components of one or more systems in the selected population.

18. A system comprising:
a data storage medium in operational relationship with at least one controller comprising:
a logic unit to compare first configuration data for a first system with second configuration data compiled from analyzing a plurality of systems in a selected population; and
a logic unit to report anomalies associated with the first system, in response to determining that the first configuration data deviates from components determined to be common to the selected population,
wherein the second configuration data is compiled from grouping systems together that have uncommon components from among said plurality of systems in the selected population,
wherein the second configuration data is compiled from systems having uncommon attributes associated with one or more components, and
wherein the second configuration data is compiled from systems having uncommon values associated with one or more attributes.

19. The system of claim 18 wherein the second configuration data is compiled for a selected population with a membership that dynamically changes as one or more systems are added or removed from the selected population.

20. The system of claim 18 wherein the first configuration data comprise information about attributes associated with the first system's components.

21. The system of claim 18 wherein the second configuration data comprises information about attributes associated with components of one or more systems in the selected population.

22. The system of claim 18 wherein the first configuration data comprise information about values assigned to attributes associated with the first system's components.

* * * * *